United States Patent [19]

Groff et al.

[11] 4,120,646
[45] Oct. 17, 1978

[54] OVEN HEATING SYSTEM

[76] Inventors: Edwin I. Groff; Edwin Terry Groff, both of 301 W. Chestnut St., West Reading, Pa. 19602

[21] Appl. No.: 774,900
[22] Filed: Mar. 7, 1977
[51] Int. Cl.² ............................................. F27B 9/00
[52] U.S. Cl. .................................. 432/121; 126/91 A; 432/144; 432/146; 432/150
[58] Field of Search ............... 432/121, 144, 146, 148, 432/150, 209; 126/91 A

[56] References Cited
U.S. PATENT DOCUMENTS

| 2,784,686 | 3/1957 | Bahlsen | 432/148 |
| 3,100,632 | 8/1963 | Mohring | 126/91 A |
| 3,208,740 | 9/1965 | Nesbitt et al. | 432/147 |

Primary Examiner—John J. Camby
Attorney, Agent, or Firm—Robert K. Youtie

[57] ABSTRACT

Heating apparatus for a baking oven or the like wherein product to be heated or baked is conveyed through the oven, and a plurality of heating elements are arranged longitudinally along the path of product movement through the oven, the heating elements each comprising a conductive tube extending transversely across the path of product movement, a burner at one tube end for introducing a combustible mixture therein, and combustion products outlet means at the other tube end for discharge into the oven chamber.

10 Claims, 4 Drawing Figures

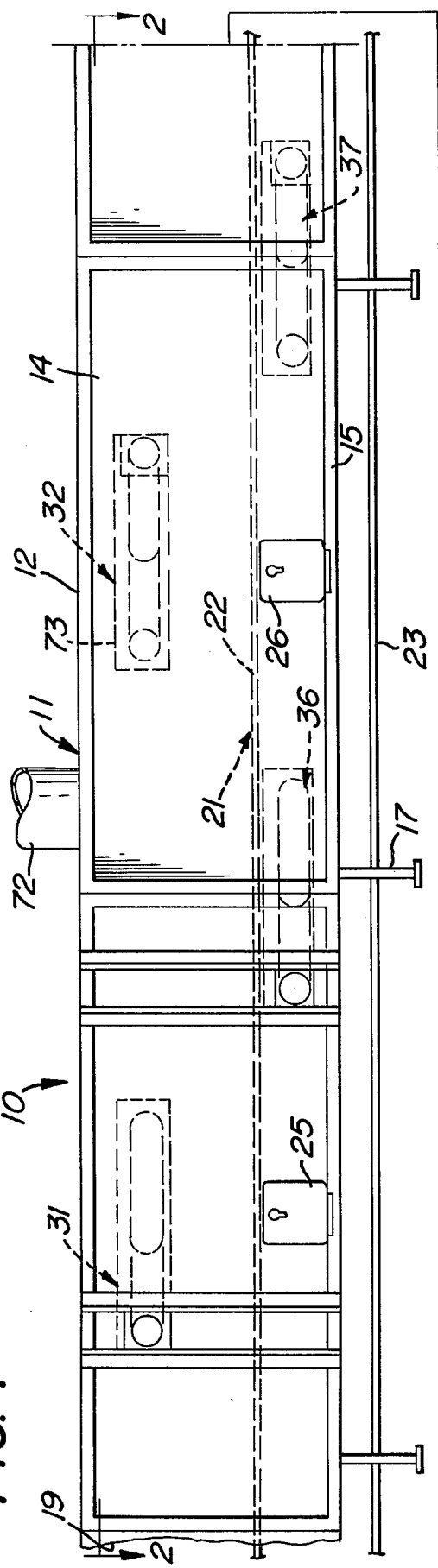

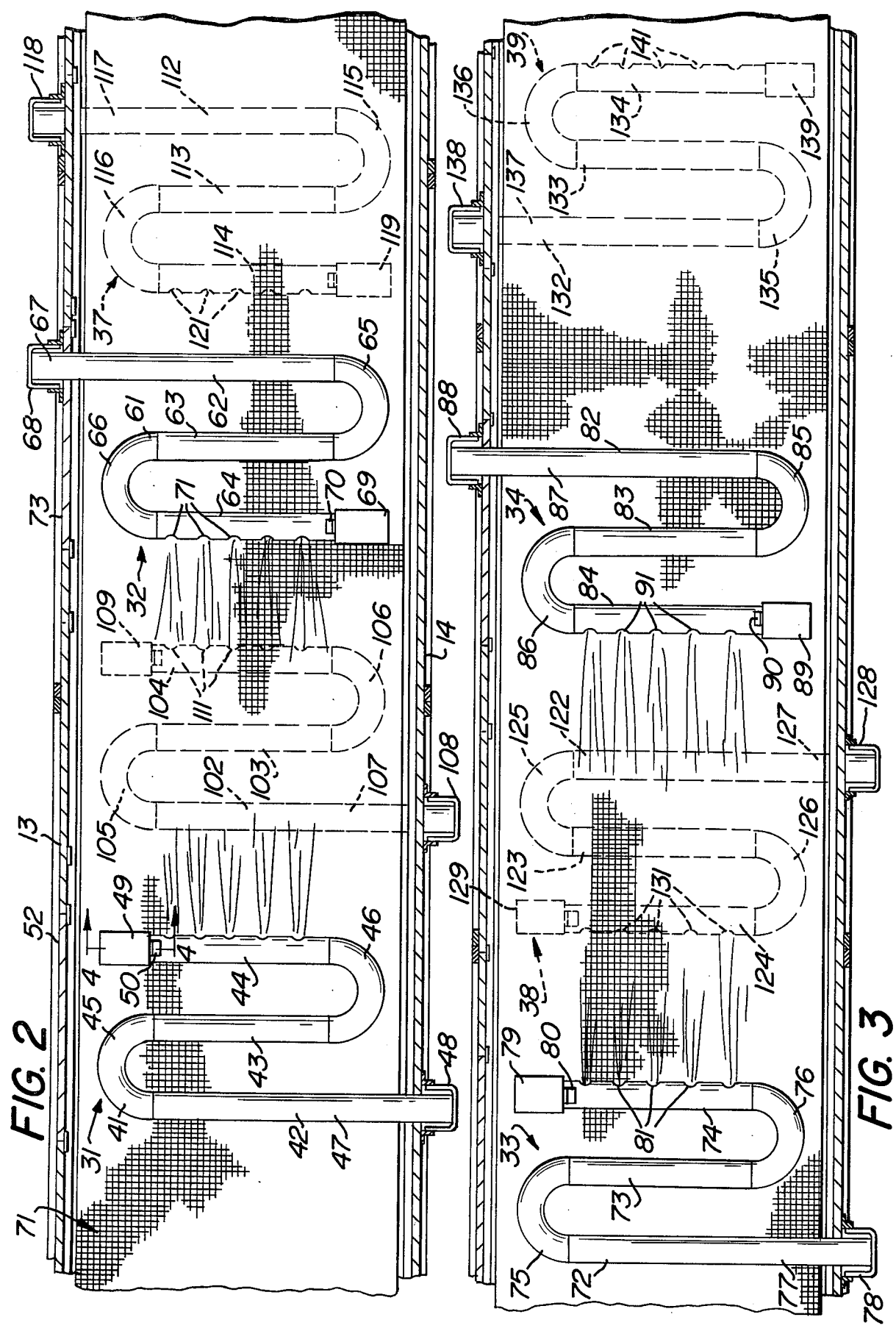

OVEN HEATING SYSTEM

BACKGROUND OF THE INVENTION

While there have been provided a wide variety of heating chambers for use as bake ovens, and the like, there remains a problem in bake ovens of the prior art which attempt to bake articles generally uniformly from all angles so as to achieve uniform color of the baked product. Of course, this is an important requisite in the baking of pretzels, and the like. Further, prior bake ovens attempting to obtain even product color on all surfaces required relatively high rates of fuel combustion to achieve a design BTU capacity.

SUMMARY OF THE INVENTION

It is, therefore, an important object of the present invention to provide heating apparatus for a pretzel baking oven, and the like, which overcome the above mentioned difficulties, effectively affords a highly uniform baking action from all angles to achieve the desired evenness of product color, and further effects considerable savings in fuel costs by producing relatively high B.T.U. per unit of fuel.

It is still another object of the present invention to provide a heating apparatus having the advantageous characteristics mentioned in the preceding paragraph which is extremely simple in construction for economy in manufacture, it is extremely easily serviced to effect substantial savings in maintenance costs, and is of extremely high thermal efficiency to produce considerable economy in cost of fuel.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described and of which the scope will be indicated by the appended claims.

BRIEF DESCRIPTION OF THE DRAWINGS

FIG. 1 is side elevational view showing a baking oven constructed in accordance with the teachings of the present invention, being broken for accommodation to the drawing space.

FIG. 2 is a sectional plan view taken generally along the line 2—2 of FIG. 1.

FIG. 3 is a sectional plan view taken generally along the line 3—3 of FIG. 1.

FIG. 4 is a sectional elevational view taken generally along the line 4—4 of FIG. 2.

DESCRIPTION OF THE PREFERRED EMBODIMENT

Referring now more particularly to the drawing, and specifically to FIG. 1 thereof, a heating apparatus in the nature of a bake oven is there generally designated 10, and includes an elongate housing or chamber 11 which may be of generally constant, rectangular cross section, say having an elevated, generally horizontal top wall 12, a pair of generally vertical, parallel spaced side walls 13 and 14 depending from opposite sides of the top wall, and a generally horizontal bottom wall 15 extending laterally between lower edges of the side walls and longitudinally coextensive with the top wall. The oven chamber or housing 11 may be spaced over a nether support or floor, as by suitable floor engageable, depending legs 17.

As noted hereinbefore, FIG. 1 illustrates the oven 11 in sections to accommodate drawing space, the left-hand end of the upper section being broken away, as at 19, and being the upstream or inlet end, while the right-hand end of the lower section is broken away at 20, which designates the downstream or outlet end of the chamber. In conventional manner a product conveyor or belt 21 has an upper run 22 extending longitudinally through the chamber 11, spaced between the upper and lower chamber walls 12 and 15, for carrying product longitudinally through the conveyor, as in baking. The conveyor 21 may include a lower or return run 23 passing upstream beneath the chamber 11 for reentry into and downstream movement through the interior of the chamber.

While the embodiment illustrated and described herein is particularly directed to the baking of pretzels, and has been primarily developed for the pretzel, it is appreciated that the instant invention is capable of many varied applications, all of which are intended to be comprehended herein.

In addition, the chamber 11 may be provided at spaced locations along its length with suitable openable closures, access openings or doors, as at 25, 26, 27, 28 and 29. The openable closures 25–29 may all be located on one side of the chamber 11, say on the side wall 14, adjacent to the bottom wall 15, to thereby afford convenient access into the lower interior regions of the chamber for cleaning and removal of debris and collected waste. The chamber walls 12–15 may be of any suitable construction, having desired insulating qualities, and may be structurally reinforced or braced, as desired, all without departing from the teachings of the present invention.

At longitudinally spaced locations interiorly along the upper region of the chamber 11 there are mounted therein a plurality of upper heating elements 31, 32, 33 and 34. The upper heating elements 31–34 are generally coplanar, in a plane spaced over the upper conveyor run 22. A lower series or row of heating elements is arranged interiorly of the chamber 11, including several elements 36, 37, 38 and 39. The lower heating elements 36–39 are generally coplanar with each other, in a plane beneath the upper conveyor run 22. It will be observed that the horizontally spaced, adjacent pair of upper heating elements 31 and 32 are located in spaced relation with respect to each other, as are the lower horizontally spaced adjacent pair of heating elements 36 and 37. Further, the upper and lower heating elements are in alternating relation with respect to each other, so that the lower element 36 is beneath the space between the adjacent upper heating elements 31 and 32, while the upper heating element 32 is over the space between adjacent heating elements 36 and 37. This relationship of alternate upper and lower heating elements may advantageously continue throughout the chamber 11. For example, the lower heating element 37 is spaced between and beneath the space between adjacent upper heating elements 32 and 33; the upper heating element 33 being spaced between and over the space between adjacent lower heating elements 37 and 38; the lower heating element 38 being spaced between and beneath the space between adjacent upper heating elements 33 and 34; and the upper heating element 34 being spaced between and over the space between adjacent lower heating elements 38 and 39. Such alternate spaced relation, while advantageous, is not absolutely essential at all times. For example, there may be prevailing reason to place an adjacent pair of upper or lower heating units without an intermediate heating unit of the other row.

The upper heating unit 31 is best seen in FIG. 2 as including an elongate hollow tube or pipe 41 of metal or other suitably heat conductive material. The elongate tube or pipe 41 is advantageously of a sinuous or undulant configuration, including a plurality of pipe portions 42, 43 and 44 extending generally transversely across the longitudinal direction or path of movement of conveyor 21. More specifically, the pipe or tube portions 42-44 may be generally straight, and in general parallelism with and substantial coplanarity with each other, lying in a plane spaced over parallel to the upper conveyor run 22. Interposed in fluid communication between the adjacent ends of parallel tube portions 42 and 43 is an arcuate interconnecting portion 45, while a similar arcuate interconnecting portion 46 is interposed in fluid communication between the adjacent ends of tube portions 43 and 44. The other end portion 47 of tube portion 42 may extend exteriorly of the chamber 11, as through side wall 42, where it is provided with a flame producer or burner 48. The burner 48 may be conventional and is provided with suitable oxygen and fuel supply means, and control elements, not shown in the drawing. Remote from the burner end portion 47 of tube or pipe 41, the distal end of pipe portion 44 is provided with an outlet gate or discharge closure 49, say swingable about a mounting hinge 50 and openable to afford interior access to the pipe 41. Also provided on the pipe portion 44 are a series or row of outlet openings or apertures 51, which are located in and open in the plane of the parallel pipe portions 42–44, and face away from the pipe portions 42 and 43.

Provided in the chamber side wall 13, proximate to the heating unit 31, may be a removable wall closure or access opening 52 affording convenient access to the heating unit 31, as for cleaning or other maintenance. The hinged end gate 49 may serve to relieve excess pressure within the heating pipe 41, and may also be openable to afford convenient access in maintenance.

The heating element 32 may be essentially identical to the heating element 31 and arranged in a facing spaced relation with respect to the latter. More specifically, the heating element 32 may include an undulant or sinuous elongate pipe or tube 61 having generally coplanar, parallel spaced portions 62, 63 and 64 extending transversely above and over the upper conveyor run 22, and generally coplanar with the parallel pipe portions 42–44 of heating element 31. The heating unit tube or pipe 61 may include intermediate or connecting portions 65 connected in fluid communication between adjacent ends of tube portions 62 and 63, and an intermediate connecting portion 66 connected in fluid communication between adjacent ends of tube portions 63 and 64. The tube portion 62 extends to an end portion 67 which is provided with a flame producer or burner 68, and the remote end of tube 61 is provided with a pressure relief valve or closure 69 hingedly connected to pipe portion 64, as by hinge 70 for swinging movement of the release valve into and out of its normally closed position. In addition, the outer tube portion 64 is provided along its outer side with a row or series of outlet openings or discharge holes 71 which lie in and open generally into the plane of the coplanar pipe portion 62–64. Further, the discharge or outlet holes 71 of element 32 are located in facing spaced relation with respect to the discharge or outlet holes 51 of the element 31. Thus, the products of combustion from heating elements 31 and 32 are expelled generally coplanar into meeting engagement with each other in the space over heating element 36.

In this region between heating elements 31 and 32, the impinging combustion gases creates fluid turbulence for effectively heating product on the conveyor 21. A stack or removal conduit 72 may be mounted on the chamber top wall 12, say between facing, impinging heating elements 31 and 32. Also, an access opening 73 may be provided in the side wall 13 for ease of access to the heating element 32.

The additional upper heating elements 33 and 34 are respectively similar to each other and hereinbefore described heating elements 31 and 32. In particular, heating element 33 is generally horizontally coplanar with and spaced downstream from heating element 32, including a plurality of generally parallel tube portions 72, 73 and 74 substantially planar with each other, being connected in series relation by intermediate arcuate tube portions 75 and 76 and having one end region 77 of tube portion 72 provided with a flame producer or burner 78. The distal end portion of heating element 33, namely the remote end of tube portion 74 is provided with a swingable closure or pressure relief valve 79 suitably hinged, as by hinge 80. The downstream side of tube portion 74 is formed with a row or series of spaced outlet openings or apertures 81 generally coplanar with the several tube portions 72-74 for discharging generally horizontally downstream from and generally coplanar with the heating element 33.

The heating element 34 is similar to the heating element 33, being disposed horizontally generally coplanar with the latter and spaced therefrom generally downstream within the chamber 11. In particular, the heating element 34 may include a plurality of generally parallel tube portions 82, 83 and 84 extending transversely across the path of conveyor 21, being connected in series fluid communication by arcuate connecting portions 85 and 86. The downstream tube portion 82 has its end portion 87 remote from connecting portion 85 connected to a flame producer or burner 88, and the distal end of the heating element 34 is provided on tube portion 84 with a swingable closure or pressure release valve 89 suitably swingable as by a hinge 90. The tube portion 84 is provided on its upstream side with a series or row of spaced outlet apertures or openings 91 for discharging fluid generally horizontally upstream, coplanar with the heating element 34.

Suitable openable access doors may be provided adjacent to respective heating elements 33 and 34.

The lower heating elements 36 and 37 are respectively similar to upper heating elements 31 and 32, but located in alternate relation therewith, being spaced below and beneath the upper run 22 of conveyor 21. More particularly, the lower heating elements 36 and 37 are both generally horizontal and coplanar with each other, the upstream heating element 36 being located beneath the space between upper heating elements 31 and 32, and including a plurality of generally parallel tube portions 102, 103 and 104 disposed in coplanar relation with each other and serially connected in fluid communication by intermediate arcuate tube portions 105 and 106. Upstream tube portion 102 extends remote from connecting portion 105 laterally to an end portion 107, to which is connected exteriorly of the adjacent side wall 114 a flame producer or burner 108. The distal end of the heating element 36, being the end of tube portion 104 remote from connecting portion 106 is provided with a swingable closure or pressure release valve 109, and the tube portion 104 is formed on its downstream side with a series or row of spaced outlet openings or apertures 111 for discharging horizontally generally in the plane of heating element 36.

Downstream from heating element 36 beneath the upper run 22 of conveyor 21 is the heating element 37, which is located beneath the space between upper heating elements 32 and 33. The heating element 37 is similar to heating element 32, including a plurality of generally parallel transverse tube portions 112, 113 and 114, serially connected together by arcuate intermediate tube portions 115 and 116, having on the downstream end 117 a flame producer or burner 118, and having on the upstream end a normally closed pressure release valve 119. Further, the upstream transverse tube portion 114 is formed on its upstream side with a row or series of through openings or outlets 121 for discharging combustion products generally horizontally coplanar with the heating element 37 toward the discharge stream of combustion products from heating element 36.

While the previously described heating elements 31, 32, 33, 34, 36 and 37 have been arranged in opposed facing pairs to achieve certain effects sometimes highly desirable, it is not essential that all heating elements be arranged in facing pairs. That is, the pair of heating elements 31 and 32 have their discharge outlets 51 and 71 in facing relation for impinging of the combustion products discharged from these heating elements to achieve a turbulent convection in the space between the heating elements. This is similarly achieved by the facing relation between upper heating elements 33 and 34, as well as the facing pair of lower heating elements 36 and 37. Thus, as described the heaters 31 and 32 provide combined heating effects of radiation, as from their sinuous tubular configuration, as well as the heating action of the turbulent gaseous combustion products. The additional pairs of heating elements 33 and 34, and 37 are similarly effective to achieve this above described combinative heating action, which has been found highly advantageous in producing a uniform baking color with minimum energy requirements.

However, by way of illustration it will be seen that the unique heating elements of the present invention need not be arranged in the impinging relationship described hereinbefore, witness heating elements 38 and 39. Heating element 38 may include a plurality of generally horizontal, parallel tube portions 122, 123 and 124 arranged in horizontal coplanarity with each other, each extending transversely of and beneath the upper conveyor run 22. The tube portions 122-124 are serially connected together in fluid communication by intermediate connecting portions 125 and 126, the downstream end of heating element 38 terminating in an end portion 127 connected to a flame producer or burner 128. The upstream end of heating element 38 may be provided with normally closed pressure release valve or closure 129, and the upstream side of tube portion 124 is formed with a series or row of through apertures or outlet openings 131 for discharging generally horizontally and coplanarly with the heating element 38. However, it will be noted that the discharge openings 131 of heating element 38 do not impinge upon the discharge products of another heating element, the next adjacent upstream heating element 37 facing upwardly away from the downstream heating element 38.

Similarly, the lower heating element 39 is beneath the upper conveyor run 22, spaced downstream of the lower heating element 38 and upper heating element 34. The heating element 39 may include a plurality of generally parallel tube portions 132, 133 and 134 arranged in horizontal coplanarity and extending transversely of and beneath the upper conveyor run 22. The transverse tube portions 132–134 are serially connected in fluid communication by intermediate arcuate connecting portions 135 and 136. The upstream tube portion 132 extends to an end region 137 away from the connecting portion 135 to a flame burner 138, while the downstream tube portion 134 remote from connecting portion 136 is provided with a normally closed pressure release valve 139. Also, the downstream tube portion 134 is formed along its length with a row or series of through apertures or outlet openings 141 for discharging combustion products generally horizontally and coplanarly with heating element 39, downstream therefrom and away from the next adjacent lower heating element 38. Thus, the downstream adjacent pair of lower heating elements 38 and 39 face away from each other so as to prevent their discharging combustion products from impinging against each other and achieving the hereinbefore described turbulent convection. Such orientation of burners may be desirable under certain circumstances, as when such turbulence is unnecessary, or when radiation from above or below is desirable without turbulence. Also, the heating elements need not be employed in pairs, but may be utilized individually to achieve the combined radiation and convection current heating as desired.

From the foregoing it is seen that the heating apparatus of the present invention is highly versatile in producing both radiant and convection heating, in desired sequential relation, both with and without gaseous turbulence, which is capable of producing pretzels and like baked products having uniform and even color all over, and simultaneously effecting substantial economies in operation by producing relatively high B.T.U.'s with relatively low energy consumption.

Although the present invention has been described in some detail by way of illustration and example for purposes of clarity of understanding, it is understood that certain changes and modifications may be made within the spirit of the invention.

What is claimed is:

1. Heating apparatus comprising an elongate chamber, conveyor means extending longitudinally through and in general parallelism with said chamber for moving product to be heated, and a plurality of heating elements in said chamber, each of said heating elements comprising an elongate conductive tube extending transversely across the path of conveyor movement, a fuel burner at one end of said tube for introducing a combustible mixture into said one tube end to provide a flame extending internally along said tube, and outlet means in said tube adjacent to the other end thereof for discharging combustion products, said outlet means opening laterally from said tube generally longitudinally of said chamber in a plane generally parallel to said conveyor and chamber, for radiation by said tube and convection by said outlet means without direct combustion product discharge against said conveyor or chamber.

2. Heating apparatus according to claim 1, said tubes each having a substantially coplanar generally sine wave configuration for multiple extension transversely across said conveyor path.

3. Heating apparatus comprising an elongate chamber, conveyor means extending longitudinally through said chamber for moving product to be heated, and a plurality of heating elements in said chamber, each of said heating elements comprising an elongate conductive tube extending transversely across the path of conveyor movement, a fuel burner at one end of said tube for introducing a combustible mixture into said one tube end to provide a flame extending internally along said tube, and outlet means in said tube adjacent to the other end thereof for discharging combustion products, said outlet means opening laterally from said tube generally longitudinally of said chamber, for radiation by said tube and convection of said outlet means, a pair of said heating elements being arranged with outlet means in facing relation for discharging their combustion products against each other, to cause gas turbulence for heating product on all sides.

4. Heating apparatus according to claim 3, said tubes each having a sinuous configuration for multiple extension transversely across said conveyor path.

5. Heating apparatus according to claim 4, said sinuously configured tubes each comprising at least three generally parallel tube portions extending transversely of the conveyor path, one of said tube portions being remote from the associated burner and having a row of openings defining said outlet means.

6. Heating apparatus according to claim 5, each of said heating elements having said generally parallel tube portions in generally coplanar relation and said outlet means facing away from said generally parallel tube portions.

7. Heating apparatus comprising an elongate chamber, conveyor means extending longitudinally through said chamber for moving product to be heated, and a plurality of heating elements in said chamber, each of said heating elements comprising an elongate conductive tube extending transverly across the path of conveyor movement, a fuel burner at one end of said tube for introducing a combustible mixture into said one tube end to provide a flame extending internally along said tube, and outlet means in said tube adjacent to the other end thereof for discharging combustion products, said outlet means opening laterally from said tube generally longitudinally of said chamber, for radiation by said tube and convection by said outlet means, said heating elements being arranged in an upper row over said conveyor and a lower row under said conveyor, adjacent pairs of heating elements of said upper row being arranged with outlet means in facing relation for discharging their combustion products against each other, adjacent pairs of heating elements of said lower row being arranged with their outlet means in facing relation for discharging their combustion products against each other, heating elements of said upper row being located over the spaces between adjacent pairs of heating elements of said lower row, and heating elements of said lower row being located under the spaces between adjacent pairs of heating elements of said upper row, whereby product moved by said conveyor is alternately subjected to radiation and gas turbulence from opposite directions.

8. Heating apparatus according to claim 7, said tubes each having a sinuous configuration for multiple extension transversely across said conveyor path.

9. Heating apparatus according to claim 8, said sinuously configured tubes each comprising at least three generally parallel tube portions extending transversely of the conveyor path, one of said tube portions being remote from the associated burner and having a row of openings defining said outlet means.

10. Heating apparatus according to claim 9, each heating element having its generally parallel tube portions generally coplanar and said outlet means facing away from said generally parallel tube portions.

* * * * *